UNITED STATES PATENT OFFICE.

VALENTIN ALLUT NOODT, OF HAMBURG, AND GEORG GÖTTSCHE, OF ALTONA, GERMANY; SAID GÖTTSCHE ASSIGNOR TO SAID NOODT.

METHOD OF PRODUCING INSULATING BODIES.

941,585. Specification of Letters Patent. Patented Nov. 30, 1909.

No Drawing. Application filed March 19, 1908. Serial No. 422,168.

*To all whom it may concern:*

Be it known that we, VALENTIN ALLUT NOODT, a citizen and resident of the free and hanseatic town of Hamburg, in the German Empire, whose post-office address is 34 Magdalenenstrasse, and GEORG GÖTTSCHE, a subject of the German Emperor, and resident of Altona, in the German Empire, whose post-office address is 10 Präsident Krahn strasse, have invented a certain new and useful Improved Method of Producing Insulating Bodies, of which the following is a specification.

The present invention relates to an improved method of producing insulating bodies.

As is known, cork, coke and coal in the form of small particles or dust or powder have been combined by means of appropriate binding media so as to form large bodies, such as plates, sheets, covers and so forth which have been advantageously employed for insulating purposes. Now whether this material be in small particles and in particular particles of spherical formation or in the form of powder, in all cases these particles together with the binding medium must be compressed into a compact whole with very small interstices. It is also known to combine small peat by means of binding media and in this case also the small particles of peat or peat dust must be layered as compactly one against the other as possible in order to form durable bodies. The use of straw is also known for this purpose but straw can only be formed into resistant bodies when the separate stalks have not only been crushed together by great pressure but also tightly pressed one against the other. In all these cases it is not possible to form bodies containing a large quantity of air because the particles in the form of small pieces, powder or stalks or stems can not be combined one with the other in such a manner that air chambers remain between them. In many cases, however, it is desirable to produce bodies of the kind in question having great porosity.

Now the present invention consists in combining pieces of charcoal presenting say the form of shavings or chips by means of a liquid binding medium and pressure so as to form bodies (sheets, covers, plates, blocks). For example, pieces of charcoal in the form of shavings or chips are placed in a bath of liquid pitch, resin or asphalt and the mass is vigorously stirred; the quantitative proportions are selected in such a manner that the liquid binding medium becomes completely attached to the pieces of charcoal and the mass appears to be almost dry, whereupon it is placed in suitable molds and compressed to the desired shapes. While the pieces of charcoal by being mixed with the binding medium for the most part lose their foliated form, still they are not so altered that (like materials in the form of small pieces or powder) they lie one against the other as a compact whole, but receive more or less a needle formation and in combining form a strong structure which includes a large amount of air. On the other hand the alteration of the leaf formation into a rod or needle formation is advantageous because leaves or shavings readily become layered one upon the other without leaving any air chambers, or on the other hand where they only contact at their edges they are not sufficiently united and air cells of excessive size are formed.

The charcoal bodies formed in accordance with the novel process are differentiated especially as carbon bodies from bodies formed from other substances, in particular from cork, owing to the fact that no part of them is found to have undergone any alteration even when they are disintegrated which is not the case with cork and similar substances. Cork when freely accessible to air and moisture undergoes alteration as it absorbs moisture, for which reason cork and similar substances must be coated with special insulating layers, which is unnecessary in the case of the bodies formed under the present invention from charcoal, the outer faces of which can be worked and polished.

We claim:

The method of producing a body for cold and heat insulating purposes, which consists in preparing a liquid binding medium, adding thereto sufficient foliated charcoal to take up the liquid, stirring the mass only until the foliated charcoal assumes a splinter formation, and then compressing the mass thus formed sufficiently to produce a porous body.

VALENTIN ALLUT NOODT.
GEORG GÖTTSCHE.

Witnesses:
MAX. F. A. KAEMPFF,
ERNEST H. L. MUMMENHOFF.